(12) United States Patent
Hinohara et al.

(10) Patent No.: US 10,507,637 B2
(45) Date of Patent: Dec. 17, 2019

(54) PEELING APPARATUS

(71) Applicant: DISCO CORPORATION, Tokyo (JP)

(72) Inventors: Kazuyuki Hinohara, Tokyo (JP); Haruki Matsuo, Tokyo (JP); Kazuya Hirata, Tokyo (JP); Ryohei Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 16/197,676

(22) Filed: Nov. 21, 2018

(65) Prior Publication Data

US 2019/0160804 A1    May 30, 2019

(30) Foreign Application Priority Data

Nov. 24, 2017 (JP) .................. 2017-225391

(51) Int. Cl.
| | |
|---|---|
| *B32B 43/00* | (2006.01) |
| *B23K 101/40* | (2006.01) |
| *B23K 26/402* | (2014.01) |
| *B23K 26/38* | (2014.01) |
| *B32B 38/10* | (2006.01) |

(52) U.S. Cl.
CPC ............ *B32B 43/006* (2013.01); *B23K 26/38* (2013.01); *B23K 26/402* (2013.01); *B23K 2101/40* (2018.08); *B32B 38/10* (2013.01); *Y10T 156/1121* (2015.01); *Y10T 156/1126* (2015.01); *Y10T 156/1132* (2015.01); *Y10T 156/1158* (2015.01); *Y10T 156/1917* (2015.01); *Y10T 156/1922* (2015.01); *Y10T 156/1928* (2015.01); *Y10T 156/1944* (2015.01)

(58) Field of Classification Search
CPC . B32B 38/10; B32B 43/006; Y10T 156/1121; Y10T 156/1126; Y10T 156/1132; Y10T 156/1158; Y10T 156/1917; Y10T 156/1922; Y10T 156/1928; Y10T 156/1944
USPC ....... 156/705, 706, 712, 707, 753, 754, 755, 156/758
See application file for complete search history.

(56) References Cited

U.S. PATENT DOCUMENTS

| | | | | |
|---|---|---|---|---|
| 5,800,665 | A | * | 9/1998 | Okaniwa ................. B32B 43/00 134/104.3 |
| 5,863,375 | A | * | 1/1999 | Cha .......................... B26D 3/28 134/137 |

(Continued)

FOREIGN PATENT DOCUMENTS

| | | |
|---|---|---|
| JP | 2000094221 A | 4/2000 |
| JP | 2011060862 A | 3/2011 |
| JP | 2016111143 A | 6/2016 |

*Primary Examiner* — Mark A Osele
*Assistant Examiner* — Nickolas R Harm
(74) *Attorney, Agent, or Firm* — Greer Burns & Crain, Ltd.

(57) ABSTRACT

A peeling apparatus includes an ingot holding unit holding an ingot in a hanging state where a portion of the ingot to be peeled off as the wafer is directed downwardly, a water container containing water therein, an ultrasonic unit immersed in the water in the water container, a moving unit moving the ingot holding unit vertically into a position where the ingot holding unit faces the ultrasonic unit and at least the portion of the ingot to be peeled off as the wafer is immersed in the water in the water container, and a nozzle ejecting water to the portion of the ingot to be peeled off as the wafer thereby to promote the peeling of the wafer from the ingot.

8 Claims, 6 Drawing Sheets

(56) References Cited

U.S. PATENT DOCUMENTS

| | | | | |
|---|---|---|---|---|
| 6,066,229 | A * | 5/2000 | Komine | A61K 31/4415 |
| | | | | 134/1 |
| 6,491,083 | B2 * | 12/2002 | De | H01L 21/67132 |
| | | | | 156/701 |
| 6,730,447 | B2 * | 5/2004 | Ito | B23K 26/04 |
| | | | | 430/22 |
| 9,452,495 | B1 * | 9/2016 | Hashimoto | B23K 26/38 |
| 2009/0056513 | A1 * | 3/2009 | Baer | B28D 1/221 |
| | | | | 83/15 |
| 2009/0277591 | A1 * | 11/2009 | Zhao | G11B 5/102 |
| | | | | 156/703 |
| 2011/0048611 | A1 * | 3/2011 | Carre | H01L 21/6835 |
| | | | | 156/73.1 |
| 2013/0032297 | A1 * | 2/2013 | Coto | B32B 43/006 |
| | | | | 156/705 |
| 2014/0038392 | A1 * | 2/2014 | Yonehara | H01L 21/304 |
| | | | | 438/463 |
| 2015/0328872 | A1 * | 11/2015 | Koyanagi | B23K 26/0853 |
| | | | | 156/73.1 |
| 2016/0228983 | A1 * | 8/2016 | Hirata | B28D 5/0011 |
| 2016/0228985 | A1 * | 8/2016 | Hirata | B28D 5/0011 |
| 2016/0288251 | A1 * | 10/2016 | Hirata | B23K 26/0006 |

* cited by examiner

PEELING APPARATUS

BACKGROUND OF THE INVENTION

Field of the Invention

The present invention relates to a peeling apparatus for peeling off a wafer from an ingot having a peel-off layer formed therein.

Description of the Related Art

Devices such as integrated circuits (ICs), large scale integration (LSI) circuits, light-emitting diodes (LEDs), and so on are formed in areas demarcated on face sides of wafers made of Si (silicon), $Al_2O_3$ (sapphire), or the like by a grid of projected dicing lines. Power devices, LEDs, and so on are formed in areas demarcated on face sides of wafers made of single-crystal SiC (silicon carbide) by a grid of projected dicing lines. A wafer with devices formed thereon is processed along the projected dicing lines by a cutting apparatus, a laser processing apparatus, or the like, and is divided into individual device chips, which will be used in electric appliances including mobile phones, personal computers, and so on.

Generally, wafers on which to form devices are produced by slicing a cylindrical ingot by a wire saw. The face and reverse sides of a wafer sliced from an ingot are ground to a mirror finish (see, for example, Japanese Patent Laid-Open No. 2000-94221). However, slicing an ingot into wafers with a wire saw and grinding the face and reverse sides of the sliced wafers is uneconomical as most (70% to 80%) of the ingot stock is discarded. Single-crystal SiC ingots suffer additional problems in that their productivity is low because they are relatively hard, are difficult to cut with a wire saw, and take a considerable time to cut, and they have a high unit cost, so that much remains to be done in the production of SiC wafers with high efficiency.

The present applicant has proposed a technology in which a laser beam having a wavelength that is transmittable through single-silicon SiC is applied to a single-silicon SiC ingot while its focal point is positioned within the single-silicon SiC ingot, thereby forming a peel-off layer on a projected cutting plane therein, and an SiC wafer is peeled off from the single-silicon SiC ingot along the peel-off layer that serves as a peeling initiation point (see, for example, Japanese Patent Laid-Open No. 2016-111143).

SUMMARY OF THE INVENTION

However, the proposed technology is problematic in that it is difficult and low in production efficiency to peel off a wafer from the ingot along the peel-off layer that serves as a peeling initiation point.

There has also been proposed a technology in which a laser beam having a wavelength that is transmittable through SiC is applied to an Si ingot while its focal point is positioned at a depth, which corresponds to a thickness of a wafer to be peeled off, in the Si ingot from an end face of the Si ingot, thereby forming a modified layer on a projected cutting plane in the Si ingot, and a wafer is peeled off from the Si ingot along the modified layer that serves as a peeling initiation point (see, for example, Japanese Patent Laid-Open No. 2011-060862). However, the proposed technology is also problematic in that it is difficult and low in production efficiency to peel off a wafer from the Si ingot along the modified layer that serves as a peeling initiation point.

It is therefore an object of the present invention to provide a peeling apparatus that is capable of easily peeling off a wafer from an ingot along peel-off layer that serves as a peeling initiation point.

In accordance with an aspect of the present invention, there is provided a peeling apparatus for peeling off a wafer from an ingot with a peel-off layer formed therein by applying a laser beam having a wavelength that is transmittable through the ingot to the ingot while a focal point of the laser beam is being positioned at a depth which corresponds to the thickness of the wafer to be peeled off, in the ingot. The peeling apparatus includes an ingot holding unit holding the ingot in a hanging state where a portion of the ingot to be peeled off as the wafer is directed downwardly, a water container containing water therein, an ultrasonic unit immersed in the water in the water container, a moving unit moving the ingot holding unit vertically into a position where the ingot holding unit faces the ultrasonic unit and at least the portion of the ingot to be peeled off as the wafer is immersed in the water in the water container, and a nozzle ejecting water to the portion of the ingot to be peeled off as the wafer thereby to promote the peeling of the wafer from the ingot.

The peeling apparatus may preferably further include a detecting unit detecting the wafer peeled off from the ingot.

The ingot may preferably include a single-crystal SiC ingot having a c-axis and a c-plane perpendicular to the c-axis, and the peel-off layer may preferably be made up of modified regions where SiC is separated into Si and C in the ingot and a succession of cracks extending isotropically along the c-plane from the modified regions, by applying a laser beam that is transmittable through single-crystal SiC to the ingot while a focal point of the laser beam is being positioned at a depth which corresponds to the thickness of the wafer, in the ingot from an end face of the ingot.

The ingot may preferably include the single-crystal SiC ingot having the c-axis inclined to a line normal to the end face thereof, the c-plane and the end face forming an off-angle therebetween, and the peel-off layer may preferably be formed by continuously forming a modified region in the single-crystal SiC ingot in a direction perpendicular to a direction in which the off-angle is formed, producing a succession of cracks extending isotropically along the c-plane from the modified region, indexing-feeding the single-crystal SiC ingot and the focal point relatively to each other by a distance that is not larger than a width of the cracks in the direction in which the off-angle is formed, then continuously forming a modified region in the single-crystal SiC ingot in the direction perpendicular to the direction in which the off-angle is formed, and producing a succession of cracks extending isotropically along the c-plane from the last-mentioned modified region.

The peeling apparatus according to the present invention includes the ingot holding unit holding the ingot in a hanging state where the portion of the ingot to be peeled off as the wafer is directed downwardly, the water container containing water therein, the ultrasonic unit immersed in the water in the water container, the moving unit moving the ingot holding unit vertically into the position where the ingot holding unit faces the ultrasonic unit and at least the portion of the ingot to be peeled off as the wafer is immersed in the water in the water container, and the nozzle ejecting water to the portion of the ingot to be peeled off as the wafer thereby to promote the peeling of the wafer from the ingot. Consequently, the wafer can easily be peeled off from the ingot along the peel-off layer that serves as a peeling initiation point.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A peeling apparatus according to an embodiment of the present invention will be described in detail below with reference to the drawings.

Figure 1:
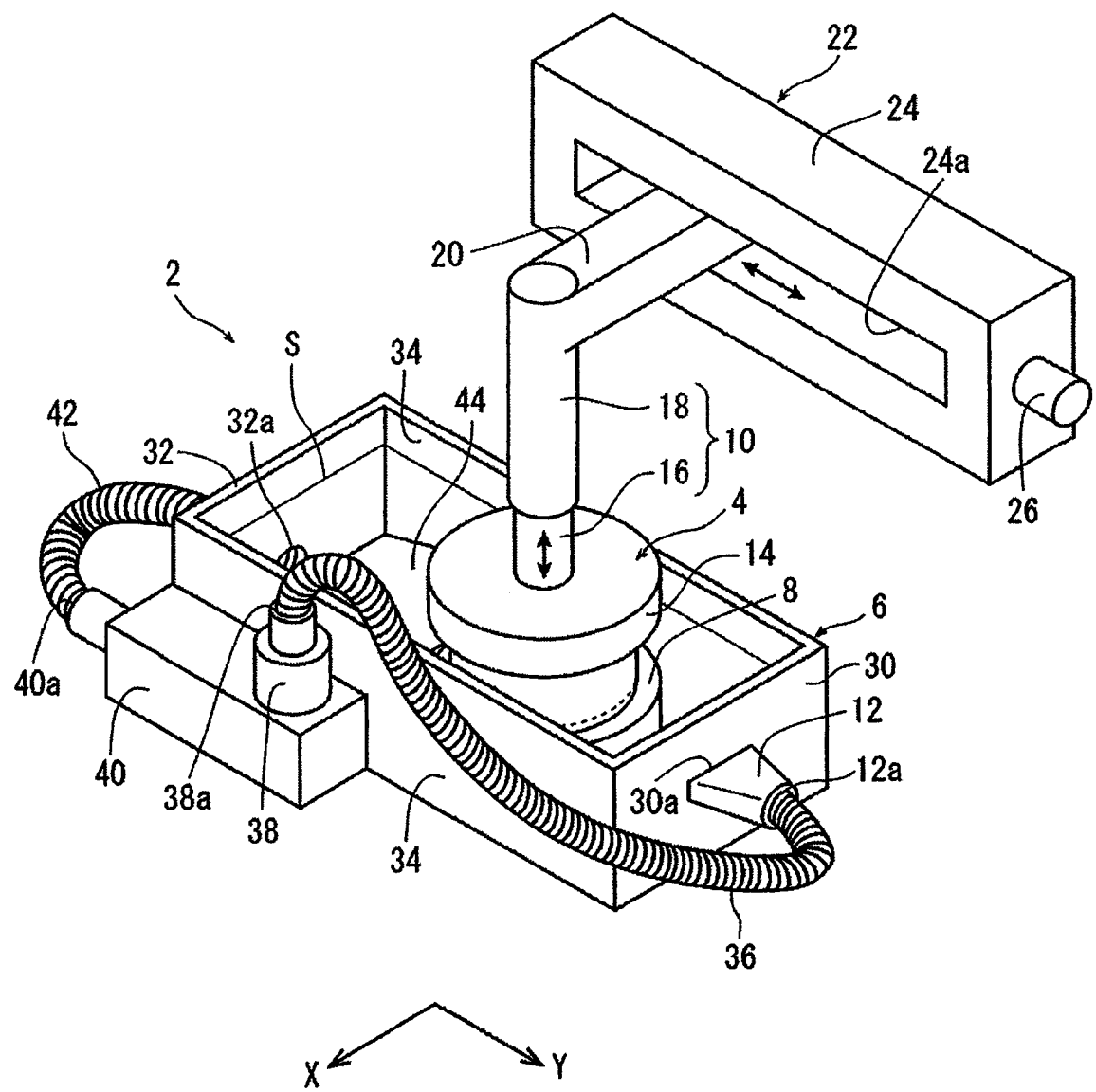
FIG. 1 is a perspective view of a peeling apparatus according to an embodiment of the present invention.
Figure 2:
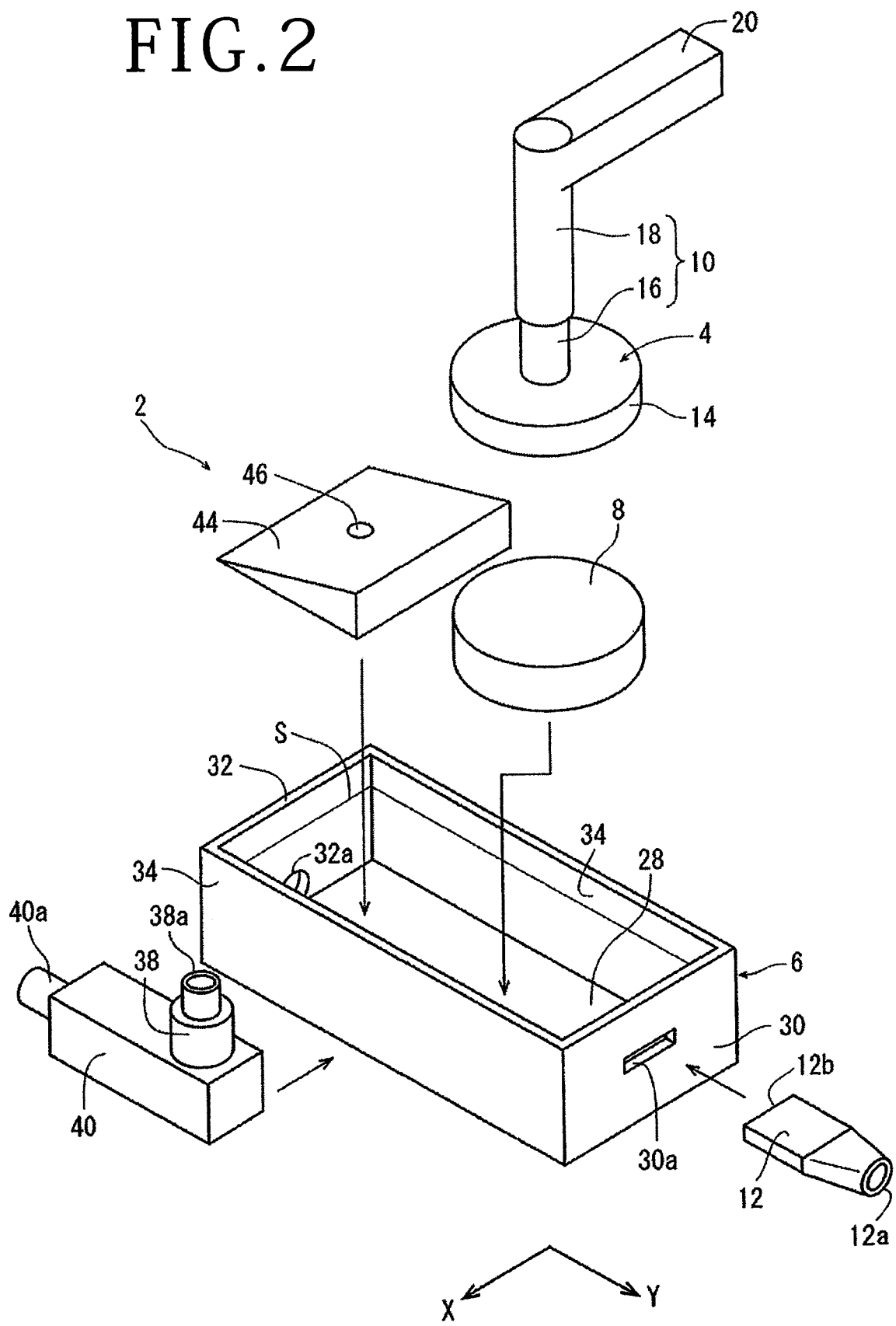
FIG. 2 is an exploded perspective view of the peeling apparatus illustrated in FIG. 1.

As illustrated in FIGS. 1 and 2, a peeling apparatus, generally denoted by 2, includes an ingot holding unit (ingot holding means) 4 for holding an ingot in a hanging state where a portion of the ingot to be peeled off as a wafer is directed downwardly, a water container 6 for containing water therein, an ultrasonic unit (ultrasonic means) 8 immersed in the water in the water container 6, a moving unit (moving means) 10 for moving the ingot holding unit 4 vertically into a position where the ingot holding unit 4 faces the ultrasonic unit 8 and at least the portion of the ingot to be peeled off as the wafer is immersed in the water in the water container 6, and a nozzle 12 for ejecting water to the portion of the ingot to be peeled off as the wafer thereby to promote the peeling of the wafer from the ingot. The water in the water container 6 has a water surface S as depicted in FIGS. 1 and 2.

The ingot holding unit 4 will be described in detail below with reference to FIGS. 1 and 2. The ingot holding unit 4 according to the present embodiment has a disk-shaped attracting member 14. The attracting member 14 has a plurality of suction holes, not depicted, defined in a lower surface thereof and connected to suction means, not depicted. The attracting member 14 attracts an upper end face of the ingot under a suction force developed by the suction means on the lower surface of the attracting member 14 via the suction holes, so that the ingot holding means 4 holds the ingot in a hanging state.

The moving unit 10 will be described in detail below. According to the present embodiment, as illustrated in FIGS. 1 and 2, the moving unit 10 includes an electric cylinder having a cylindrical piston rod 16 extending upwardly from an upper surface of the attracting member 14, a hollow cylindrical cylinder tube 18 which supports the piston rod 16 vertically and telescopically movably therein, and an electric motor, not depicted, for moving the piston rod 16 vertically through a ball screw, not depicted. The moving unit 10 moves the attracting member 14 of the ingot holding unit 4 vertically when the electric motor moves the piston rod 16 vertically and telescopically in the cylinder tube 18, and stops the attracting member 14 at any desired position when the electric motor is de-energized.

According to the present embodiment, an arm 20 that extends in an X-axis direction indicated by an arrow X in FIGS. 1 and 2 has an end connected to the upper end of the cylinder tube 18. The other end of the arm 20 is connected to an arm moving mechanism 22 for moving the arm 20 in Y-axis directions indicated by an arrow Y in FIGS. 1 and 2. The arm moving mechanism 22 has a frame 24 in the shape of a rectangular parallelepiped with a guide slot 24a defined therein, a ball screw, not depicted, disposed in the frame 24 and extending in the Y-axis directions, and an electric motor 26 mounted on the frame 24 and having an output shaft connected to an end of the ball screw. A nut, not depicted, threaded over the ball screw of the arm moving mechanism 22 is fixed to the other end, or proximal end, of the arm 20 that extends through the guide slot 24a into the frame 24. The ball screw converts rotary motion of the electric motor 26 into linear motion, which is transmitted via the nut to the arm 20, moving the arm 20 in the Y-axis directions along the guide slot 24a. The X-axis directions and the Y-axis directions are perpendicular to each other and jointly make up a substantially horizontal plane XY.

The water container 6, the ultrasonic unit 8, and the nozzle 12 will be described in detail below. According to the present embodiment, the water container 6 is shaped as a rectangular parallelepiped, and has a rectangular bottom wall 28, a front wall 30 extending upwardly from one end of the bottom wall 28 in one of the Y-axis directions, a rear wall 32 extending upwardly from the other end of the bottom wall 28 in the other of the Y-axis directions, and a pair of side walls 34 extending upwardly respectively from both ends of the bottom wall 28 in the X-axis directions. The water container 6 is open upwardly, i.e., is free of a top wall. The ultrasonic unit 8, which is disk-shaped, is mounted on the bottom wall 28 and immersed in the water in the water container 6. The ultrasonic unit 8 is made of piezoelectric ceramics or the like, and oscillates and emits ultrasonic waves. As illustrated in FIG. 2, the front wall 30 has an elongate rectangular supply port 30a defined therein which extends in the X-axis directions, and the rear wall 32 has a circular discharge port 32a defined therein. The nozzle 12 is mounted in the supply port 30a. The nozzle 12 includes an outer portion that projects from the supply port 30a out of the water container 6 and is tapered into a circular inlet 12a. The nozzle 12 also includes an inner portion that projects from the supply port 30a into the water container 6 and has an outlet 12b (see FIGS. 6 and 7) that is of an elongate rectangular shape complementary to the supply port 30a. As illustrated in FIG. 1, the discharge port 32a of the water container 6 is connected through a bellows-shaped discharge hose 42 to an inlet 40a of a filter case 40 that houses a filter, not depicted, therein. The filter case 40 has an outlet held in fluid communication with an inlet port, not depicted, of a pump 38 mounted on the filter case 40. The pump 38 has an outlet port 38a connected through a supply hose 36 to the inlet 12a of the nozzle 12. When the pump 38 is actuated, the water in the water container 6 flows from the discharge port 32a through the discharge hose 42 into the filter, from which the filtered water is drawn into the inlet port of the pump 38. The water is then discharged from the pump 38 and supplied through the supply hose 36 and the nozzle 12 to the water container 6.

According to the present embodiment, a wafer rest table 44 is disposed on a portion of the bottom wall 28 that extends downstream of the ultrasonic unit 8 toward the discharge port 32a with respect to the direction in which water flows in the water container 6. The wafer rest table 44 has an upper surface slanted downwardly toward its downstream end. The wafer rest table 44, which serves to support thereon a wafer peeled off from the ingot, is immersed in the water in the water container 6. A detecting unit (detecting means) 46 for detecting a wafer peeled off from the ingot is disposed on the upper surface of the wafer rest table 44. The detecting unit 46 may include a photoelectric sensor or the like.

Figure 3A:
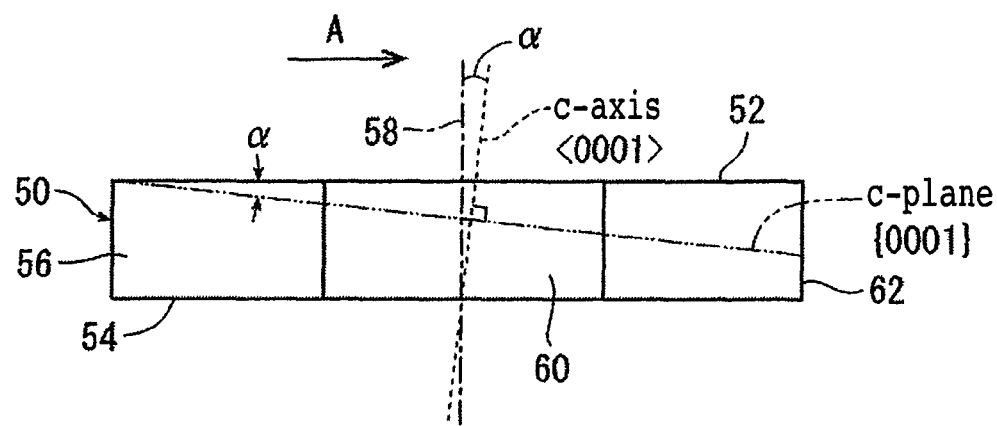
FIG. 3A is a front elevational view of an ingot.
Figure 3B:
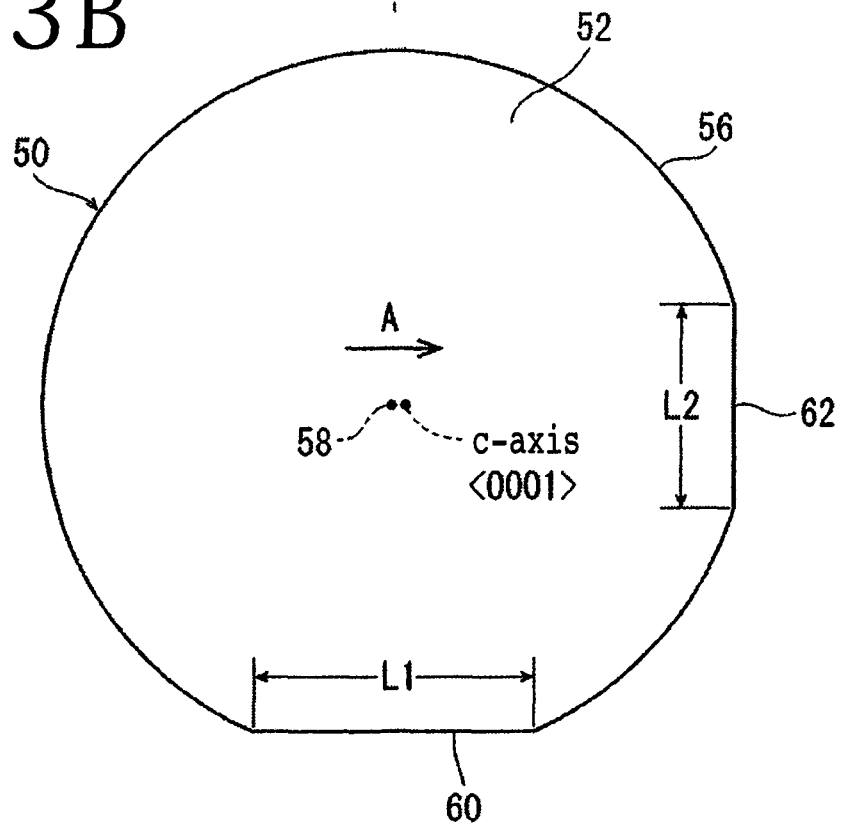
FIG. 3B is a plan view of the ingot.

FIGS. 3A and 3B illustrate an ingot 50 before a peel-off layer is formed therein. The ingot 50 is made of hexagonal single-crystal SiC and has a cylindrical shape as a whole. The single-crystal SiC ingot 50 has a circular first end face 52, a circular second end face 54 opposite the first end face 52, a peripheral face 56 positioned between the first end face 52 and the second end face 54, a c-axis (<0001> direction) extending from the first end face 52 to the second end face 54, and a c-plane ({0001} plane) perpendicular to the c-axis. The c-axis is inclined to a line 58 normal to the first end face 52, and the c-plane and the first end face 52 form an off-angle α (e.g., α=1, 3, or 6 degrees) therebetween. The direction to which the c-axis is inclined to the line 58, i.e., the direction in which the off-angle α is formed, is indicated by an arrow A in FIGS. 3A and 3B. The peripheral face 56 of the single-crystal SiC ingot 50 has a first orientation flat 60 and a second orientation flat 62, each of a rectangular shape, for indicating a crystal orientation. The first orientation flat 60 lies parallel to the direction A in which the off-angle α is formed, whereas the second orientation flat 62 lies perpendicularly to the direction A in which the off-angle α is formed. As depicted in FIG. 3B, a length L2 of the second orientation flat 62 is smaller than a length L1 of the first orientation flat 60, as viewed from above (L2<L1). The single-crystal SiC ingot from which a wafer is peeled off by the peeling apparatus 2 after a peel-off layer has been formed therein is not limited to the above single-crystal SiC ingot 50, but may be a single-crystal SiC ingot where the c-axis is not inclined to the line normal to the first end face and the off-angle between the c-plane and the first end face is 0 degree, i.e., the line normal to the first end face and the c-axis are aligned with each other, or an ingot made of a material other than single-crystal SiC, such as Si (silicon), GaN (gallium nitride) or the like.

Figure 4A:
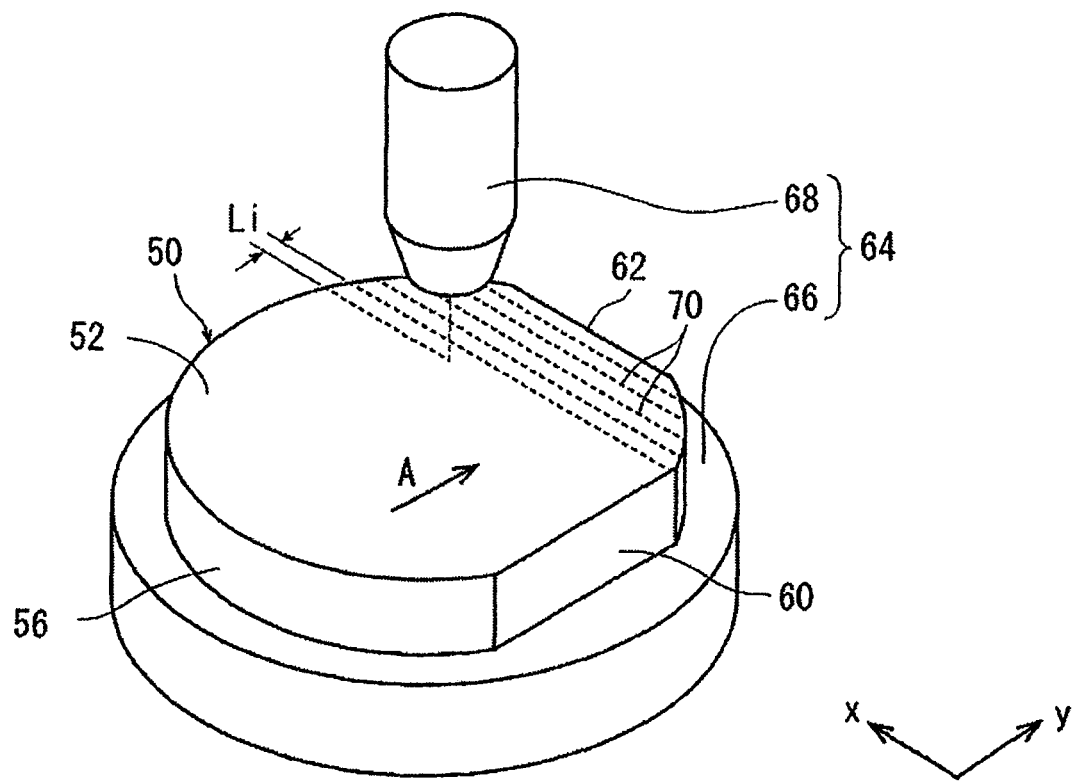
FIG. 4A is a perspective view illustrating the manner in which a peel-off layer is formed in the ingot illustrated in FIGS. 3A and 3B.
Figure 4B:
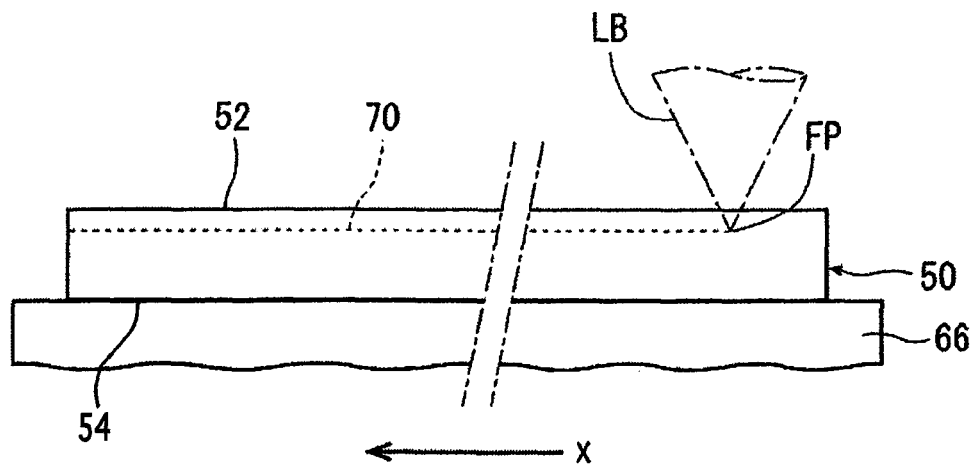
FIG. 4B is a front elevational view illustrating the manner in which the peel-off layer is formed in the ingot illustrated in FIGS. 3A and 3B.

For peeling off a wafer from the ingot 50 with the peeling apparatus 2, it is necessary to form a peel-off layer in the ingot 50. A peel-off layer can be formed in the ingot 50 using a laser processing apparatus 64 that is partly illustrated in FIGS. 4A and 4B. As illustrated in FIGS. 4A and 4B, the laser processing apparatus 64 includes a chuck table 66 for supporting a workpiece, i.e., the ingot 50, thereon and a beam condenser 68 for applying a pulsed laser beam LB to the workpiece held on the chuck table 66. The chuck table 66 is arranged to hold the workpiece under suction on its upper surface. The chuck table 66 is rotatable about a vertical central axis by rotating means, not depicted, and is also movable in x-axis directions by x-axis moving means, not depicted, and in y-axis directions by y-axis moving means, not depicted. The laser processing apparatus 64 includes a pulsed laser beam oscillator, not depicted, for oscillating and emitting the pulsed laser beam LB. The beam condenser 68 includes a condensing lens, not depicted, for focusing and applying the laser beam LB from the pulsed laser beam oscillator to the workpiece on the chuck table 66. The x-axis directions are directions indicated by an arrow x in FIGS. 4A and 4B, whereas the y-axis directions are directions indicated by an arrow y in FIGS. 4A and 4B and are perpendicular to the x-axis directions. The x-axis directions and the y-axis directions jointly make up a substantially horizontal plane xy. The X-axis directions and the Y-axis directions illustrated in FIGS. 1 and 2 and the x-axis directions and the y-axis directions illustrated in FIGS. 4A and 4B may coincide with each other or may be different from each other.

Referring to FIGS. 4A and 4B, for forming a peel-off layer in the ingot 50, the ingot 50 is held under suction on the upper surface of the chuck table 66. At this time, one end face, i.e., the first end face 52, of the ingot 50 faces upwardly. Alternatively, the ingot 50 may be secured to the chuck table 66 by an adhesive, e.g., an epoxy-resin adhesive, interposed between the other end face, i.e., the second end face 54, of the ingot 50 and the upper surface of the chuck table 66. Then, an image of the ingot 50 is captured from above by image capturing means, not depicted, of the laser processing apparatus 64. Then, based on the image of the ingot 50 captured by the image capturing means, the chuck table 66 is moved by the x-axis moving means and the y-axis moving means and rotated by the rotating means to adjust the orientation of the ingot 50 to a predetermined direction and also to adjust the position of the ingot 50 with respect to the beam condenser 68 in the xy plane. For adjusting the orientation of the ingot 50 to the predetermined direction, as illustrated in FIG. 4A, the second orientation flat 62 is aligned with the x-axis directions to align a direction perpendicular to the direction A in which the off-angle α is formed with the x-axis directions and also to align the direction A in which the off-angle α is formed with the y-axis directions. Then, the beam condenser 68 is vertically moved, i.e., elevated or lowered, by focal point position adjusting means, not depicted, of the laser processing apparatus 64 to position a focal point FP (see FIG. 4B) for the pulsed laser beam LB in the ingot 50 at a depth, which corresponds to the thickness of a wafer to be peeled off, from the first end face 52 of the ingot 50.

Figure 5A:
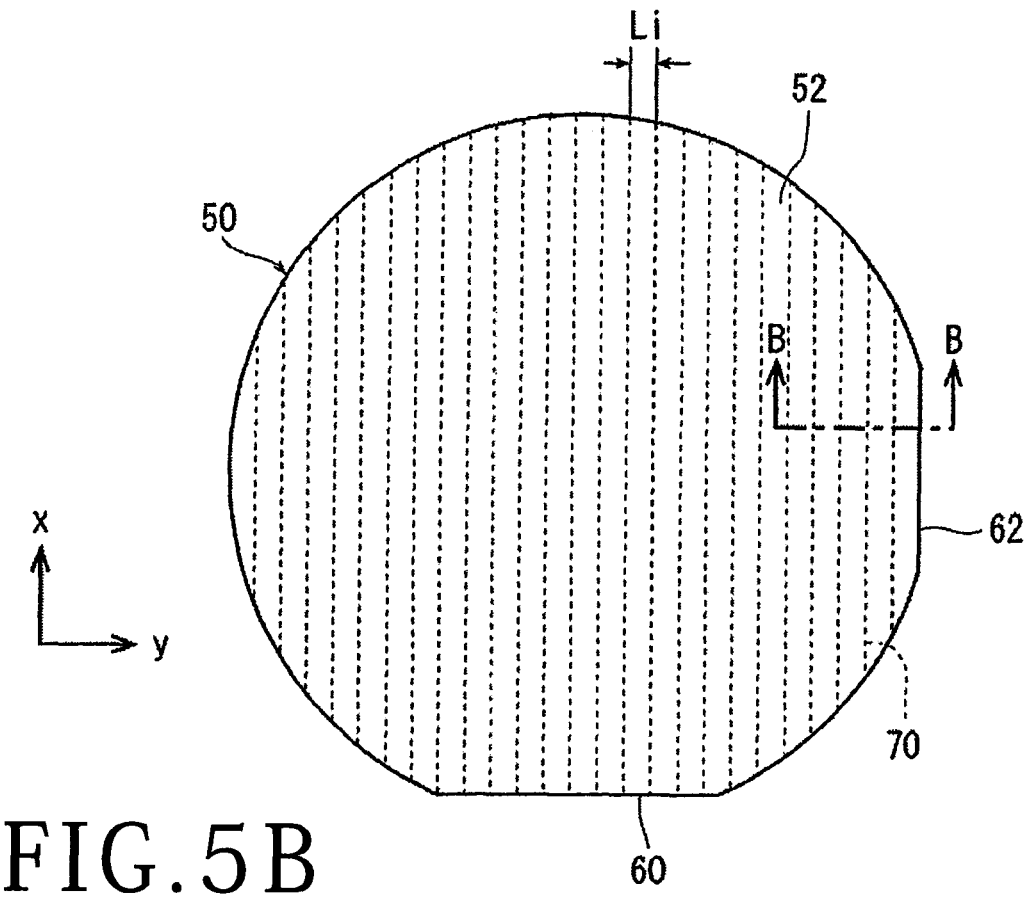
FIG. 5A is a plan view of the ingot with the peel-off layer formed therein.
Figure 5B:
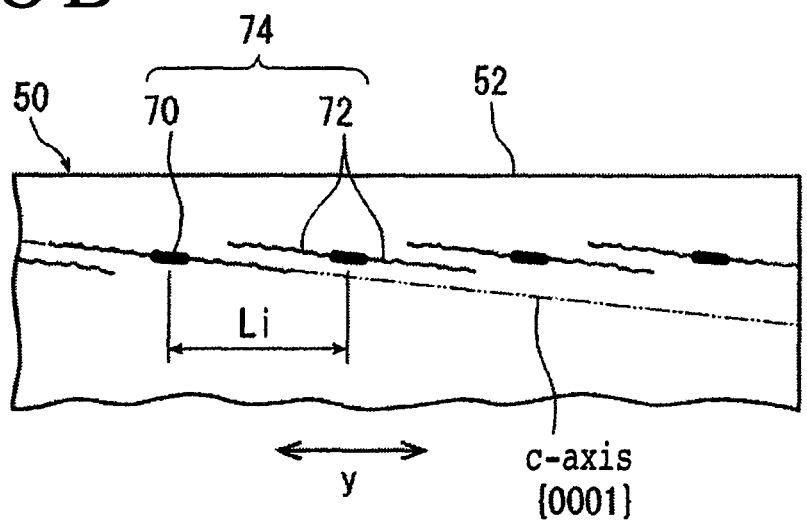
FIG. 5B is an enlarged cross-sectional view taken along line B-B of FIG. 5A.

Thereafter, the laser processing apparatus 64 performs a peel-off layer forming step. In the peel-off layer forming step, while the chuck table 66 is being moved in one of the x-axis directions that are aligned with the direction perpendicular to the direction A in which the off-angle α is formed, the beam condenser 68 applies the laser beam LB, which has a wavelength that is transmittable through single-crystal SiC, to the ingot 50. As illustrated in FIGS. 5A and 5B, the pulsed laser beam LB applied to the ingot 50 separates SiC in the ingot into Si (silicon) and C (carbon) and the pulsed laser beam LB subsequently applied to the ingot 50 is absorbed by previously formed C, producing a modified region 70 where SiC is successively separated into Si and C. The modified region 70 is continuously formed in the ingot 50 along the direction perpendicular to the direction A in which the off-angle α is formed. At the same time, a succession of cracks 72 extending isotropically along the c-plane from the modified region 70 are developed in the ingot 50.

As illustrated in FIGS. 4A, 4B, 5A, and 5B, after the peel-off layer forming step, the laser processing apparatus 64 performs an indexing feed step. In the indexing feed step, the chuck table 66 is indexing-fed relatively to the focal point FP in one of the y-axis directions by a predetermined indexing feed distance Li that is not larger than the width of the cracks 72 on both sides of the modified regions 70. Then, the peel-off layer forming step and the indexing feed step are alternately carried out to form a plurality of modified regions 70, each extending continuously along the direction perpendicular to the direction A in which the off-angle α is formed, at spaced intervals each equal to the indexing feed distance Li in the direction A in which the off-angle α is formed, and also to form a succession of cracks 72 extending isotropically along the c-plane from the modified regions 70, such that adjacent cracks 72 in the direction A in which the off-angle α is formed vertically overlap each other. In this manner, a peel-off layer 74 made up of the modified regions 70 and the cracks 72 is formed in the ingot 50 at the depth, which corresponds to the thickness of a wafer to be peeled off, from the first end face 52 of the ingot 50. The peel-off layer 74 has a lower mechanical strength than the remainder of the ingot 50, so that a wafer can be peeled off from the ingot 50 along the peel-off layer 74, as described later.

Figure 6:
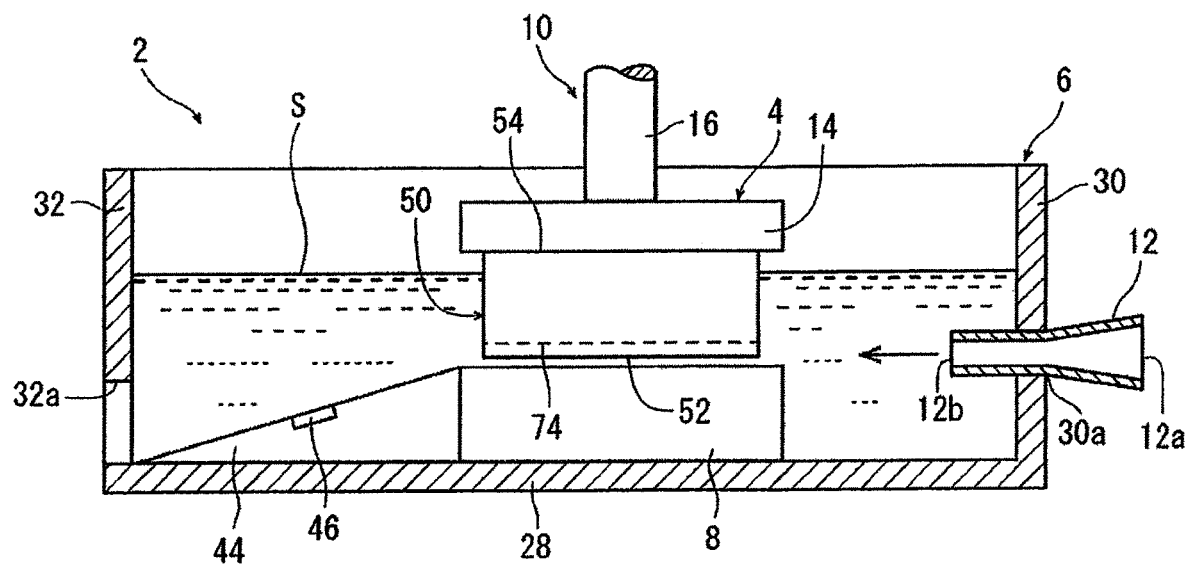
FIG. 6 is a cross-sectional view of the peeling apparatus, illustrating the manner in which ultrasonic waves are applied to the ingot and water is ejected to a portion of the ingot that is to be peeled off as a wafer.
Figure 7:
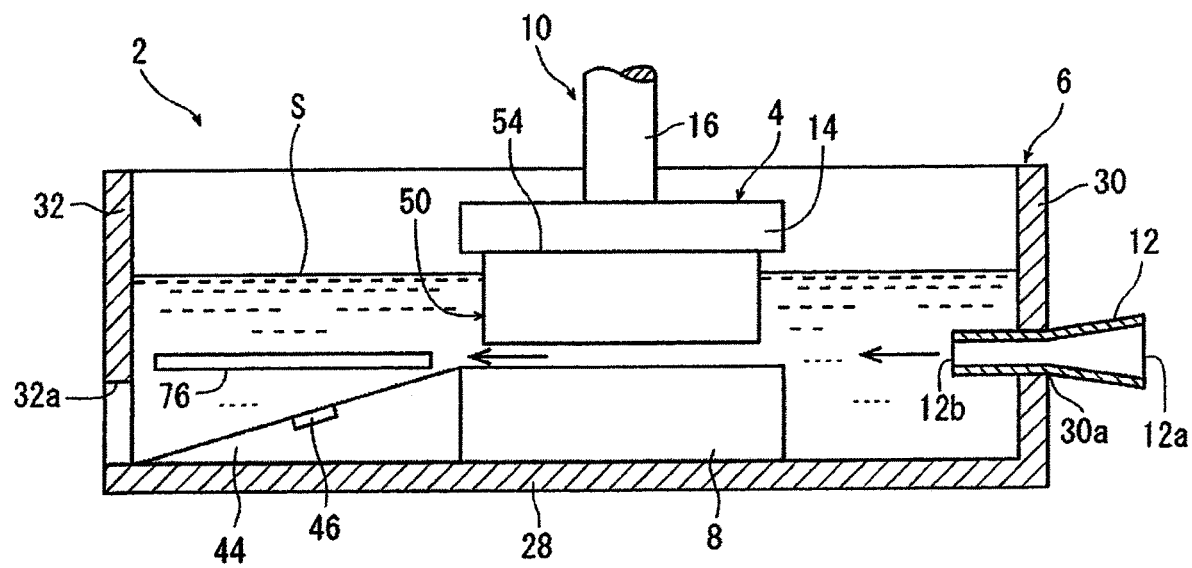
FIG. 7 is a cross-sectional view of the peeling apparatus, illustrating the manner in which a wafer is peeled off from the ingot.

The peel-off layer 74 can be formed under the following processing conditions:

Wavelength of the pulsed laser beam: 1064 nm
Repetitive frequency: 60 kHz
Average output power: 1.5 W
Pulse duration: 4 ns
Focal point diameter: 3 μm
Numerical aperture (NA) of the condensing lens: 0.65
Vertical position of the focal point: 300 μm from the first end face of the ingot
Feed speed: 200 mm/s
Indexing feed distance: 250 μm to 400 μm A process of peeling off a wafer from the ingot 50 with the peel-off layer 74 formed therein, using the peeling apparatus 2 will be described below with reference to FIGS. 6 and 7. According to the present embodiment, the second end face 54 of the ingot 50 is attracted to the attracting member 14 so that the ingot 50 is held in a hanging fashion by the ingot holding unit 4. At this time, the portion of the ingot 50 to be peeled off as a wafer, i.e., the first end face 52 of the ingot 50 which is closer to the peel-off layer 74, is directed downwardly. Then, the arm moving mechanism 22 moves the arm 20 to position the first end face 52 of the ingot 50 in vertically facing relation to the ultrasonic unit 8 that is immersed in the water in the water container 6. Then, the moving unit 10 lowers the attracting member 14 until the first end face 52 of the ingot 50 is spaced from the upper surface of the ultrasonic unit 8 by a distance ranging from 0.5 to 2.0 mm and at least the portion of the ingot 50 to be peeled off as a wafer, i.e., a portion of the ingot 50 that extends from the first end face 52 to the peel-off layer 74 in the present embodiment, is immersed in the water in the water container 6. According to the present embodiment, as illustrated in FIG. 6, the water surface S is positioned between the peel-off layer 74 and the second end face 54 after the attracting member 14 has thus been lowered. Then, the ultrasonic unit 8 is energized to oscillate and emit ultrasonic waves and the pump 38 is actuated to eject water from the outlet 12b of the nozzle 12 toward the portion of the ingot 50 to be peeled off as a wafer. As illustrated in FIG. 7, because of the ultrasonic waves from the ultrasonic unit 8, a wafer 76 is now peeled off from the ingot 50 along the peel-off layer 74 that serves as a peeling initiation point. The peeled-off wafer 76 is carried on the flow of water in the water container 6 to the wafer rest table 44 and placed thereon. The wafer 76 that is placed on the wafer rest table 44 is detected by the detecting unit 46.

As described above, the peeling apparatus 2 according to the present embodiment includes the ingot holding unit 4 for holding the ingot 50 in a hanging state where the portion of the ingot 50 to be peeled off as a wafer is directed downwardly, the water container 6 for containing water therein, the ultrasonic unit 8 immersed in the water in the water container 6, the moving unit 10 for moving the ingot holding unit 4 vertically into a position where the ingot holding unit 4 faces the ultrasonic unit 8 and at least the portion of the ingot to be peeled off as the wafer is immersed in the water in the water container 6, and the nozzle 12 for ejecting water to the portion of the ingot to be peeled off as the wafer thereby to promote the peeling of the wafer from the ingot. Therefore, the peeling apparatus 2 can easily peel off the wafer 76 from the ingot 50 along the peel-off layer 74 that serves as a peeling initiation point.

In the present embodiment, when the peel-off layer 74 is to be formed in the ingot 50 in the peel-off layer forming step, the ingot 50 is moved relatively to the focal point FP in the direction perpendicular to the direction A in which the off-angle α is formed, and in the indexing feed step, the ingot 50 is move relatively to the focal point FP in the direction A in which the off-angle α is formed. However, in the peel-off layer forming step, the ingot 50 and the focal point FP may be moved relatively to each other in directions not perpendicular to the direction A in which the off-angle α is formed, and in the indexing feed step, the ingot 50 and the focal point FP may be moved relatively to each other in directions different from the direction A in which the off-angle α is formed.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A peeling apparatus for peeling off a wafer from an ingot with a peel-off layer formed therein by applying a laser beam having a wavelength that is transmittable through the ingot to the ingot while a focal point of the laser beam is being positioned at a depth equal to a thickness of the wafer to be peeled off, in the ingot, the peeling apparatus comprising:
    an ingot holding unit holding the ingot in a hanging state where a portion of the ingot to be peeled off as the wafer is directed downwardly;
    a water container containing water therein;
    an ultrasonic unit immersed in the water in the water container;
    a moving unit moving the ingot holding unit vertically into a position where the ingot holding unit faces the ultrasonic unit and at least the portion of the ingot to be peeled off as the wafer is immersed in the water in the water container; and
    a nozzle ejecting water to the portion of the ingot to be peeled off as the wafer thereby to promote the peeling of the wafer from the ingot.

2. The peeling apparatus according to claim 1, further comprising:
    a detecting unit detecting the wafer peeled off from the ingot.

3. The peeling apparatus according to claim 1, wherein:
the ingot includes a single-crystal SiC ingot having a c-axis and a c-plane perpendicular to the c-axis, and
the peel-off layer is made up of modified regions where SiC is separated into Si and C in the ingot and a succession of cracks extending isotropically along the c-plane from the modified regions, by applying a laser beam that is transmittable through single-crystal SiC to the ingot while a focal point of the laser beam is being positioned at a depth which corresponds to the thickness of the wafer, in the ingot from an end face of the ingot.

4. The peeling apparatus according to claim 3, wherein:
the ingot includes the single-crystal SiC ingot having the c-axis inclined to a line normal to the end face thereof, the c-plane and the end face forming an off-angle therebetween, wherein the off-angle is less than 6 degrees, and
the peel-off layer is formed by continuously forming a modified region in the single-crystal SIC ingot in a direction perpendicular to a direction in which the off-angle is formed, producing a succession of cracks extending isotropically along the c-plane from the modified region, indexing-feeding the single-crystal SiC ingot and the focal point relatively to each other by a distance that is not larger than a width of the cracks in the direction in which the off-angle is formed, then continuously forming a modified region in the single-crystal SiC ingot in the direction perpendicular to the direction in which the off-angle is formed, and producing a succession of cracks extending isotropically along the c-plane from the last-mentioned modified region.

5. A peeling apparatus for peeling off a wafer from an ingot with a peel-off layer formed therein, the peeling apparatus comprising:
an ingot holding unit holding the ingot in a hanging state where a portion of the ingot to be peeled off as the wafer is directed downwardly;
a water container containing water therein;
an ultrasonic unit immersed in the water in the water container;
a moving unit moving the ingot holding unit vertically into a position where the ingot holding unit faces the ultrasonic unit and at least the portion of the ingot to be peeled off as the wafer is immersed in the water in the water container; and
a nozzle ejecting water to the portion of the ingot to be peeled off as the wafer thereby to promote the peeling of the wafer from the ingot.

6. The peeling apparatus according to claim 5, further comprising:
a detecting unit detecting the wafer peeled off from the ingot.

7. The peeling apparatus according to claim 6, wherein:
the ingot includes a single-crystal SiC ingot having a c-axis and a c-plane perpendicular to the c-axis, and
the peel-off layer is made up of modified regions where SiC is separated into Si and C in the ingot and a succession of cracks extending isotropically along the c-plane from the modified regions, by applying a laser beam that is transmittable through single-crystal SiC to the ingot while a focal point of the laser beam is being positioned at a depth which is equal to the thickness of the wafer, in the ingot from an end face of the ingot.

8. The peeling apparatus according to claim 7, wherein:
the ingot includes the single-crystal SiC ingot having the c-axis inclined to a line normal to the end face thereof, the c-plane and the end face forming an off-angle therebetween, wherein the off-angle is less than 6 degrees, and
the peel-off layer is formed by continuously forming a first modified region in the single-crystal SiC ingot in a direction perpendicular to a direction in which the off-angle is formed, producing a succession of cracks extending isotropically along the c-plane from the first modified region, indexing-feeding the single-crystal SIC ingot and the focal point relatively to each other by a distance that is not larger than a width of the cracks in the direction in which the off-angle is formed, then continuously forming a second modified region in the single-crystal SiC ingot in the direction perpendicular to the direction in which the off-angle is formed, and producing a succession of cracks extending isotropically along the c-plane from the second modified region.

* * * * *